United States Patent [19]

Annen

[11] Patent Number: 4,921,051
[45] Date of Patent: May 1, 1990

[54] GREEN REFRESHER

[75] Inventor: Osamu Annen, Tonami, Japan

[73] Assignee: Kabushiki Kaisha Tonami Seisakusho, Tonami, Japan

[21] Appl. No.: 256,906

[22] Filed: Oct. 12, 1988

[30] Foreign Application Priority Data

Oct. 14, 1987 [JP] Japan .................. 62-257445

[51] Int. Cl.$^5$ ..................... A01B 39/10; A01B 45/02
[52] U.S. Cl. ........................ 172/21; 172/42; 172/95
[58] Field of Search ............. 172/21, 40, 54, 53, 172/84, 97, 93, 94, 95, 699, 42, 43, 92

[56] References Cited

U.S. PATENT DOCUMENTS

| | | | |
|---|---|---|---|
| 1,168,813 | 1/1916 | Klopfenstein | 172/84 |
| 3,935,905 | 2/1976 | Chery | 172/41 X |
| 3,952,810 | 4/1976 | Ulrich | 172/40 |
| 4,096,915 | 6/1978 | Groth | 172/84 X |
| 4,187,914 | 2/1980 | van der Lely | 172/53 |
| 4,351,396 | 9/1982 | Moulton | 172/41 X |
| 4,375,836 | 3/1983 | Weichel | 172/40 |
| 4,658,909 | 4/1987 | McDermott et al. | 172/95 X |

FOREIGN PATENT DOCUMENTS

| | | | |
|---|---|---|---|
| 2607364 | 10/1976 | Fed. Rep. of Germany | 172/40 |
| 653985 | 5/1951 | United Kingdom | 172/42 |
| 1392193 | 4/1975 | United Kingdom | 172/40 |

*Primary Examiner*—Randolph A. Reese
*Assistant Examiner*—Jeffrey L. Thompson
*Attorney, Agent, or Firm*—Michael N. Meller

[57] ABSTRACT

A soil tiller or cultivator adapted to till the surface soil covered with a lawn by plural cutters to cure the compaction of the soil below the lawn surface. The till is provided with a motion transmission unit for transmitting the motive power of a driving prime mover to the cutters in the form of at least two vibrations dephased with respect to one another.

4 Claims, 3 Drawing Sheets

GREEN REFRESHER

BACKGROUND OF THE INVENTION

1. Field of the Invention

This invention relates to a green refresher, that is, a soil tiller or cultivator adapted to till the surface soil covered with lawn or green to cure the compaction of the soil below the lawn surface. More particularly, it relates to a green refresher provided with a cutter driving unit which may undergo only small oscillations or vibrations and which is suitable for refreshing the green or lawn of a golf field.

2. Description of the Prior Art

In a grassy area, such as a lawn, the ground surface is trodden under foot and tramped as time elapses so that the growth of the lawn is obstructed.

For these conditions, a tiller or cultivator provided with vibrational cutters has been used extensively. With the cutters penetrated through to the core soil below the surface soil from above the lawn surface, the cutters are moved as they are imparted vibrations and oscillations so as to till and crush the tramped soil to cut the old roots as well as to cause the moisture, oxygen and the fertilizer to be penetrated deep below the ground surface.

For such purpose, a tiller provided with plural juxtaposed cutters has been used extensively for improving the operating efficiency.

However, in the conventional device employing a plurality of juxtaposed cutters, oscillations or vibrations are imparted to the cutters at the same phase, that is, simultaneously and in the same direction. In such case, the energy of oscillations of the cutters and the force of resistance or reaction that is produced by the friction of the oscillating cutters in the soil are increased with an increase in the number of cutters. For this reason, in the conventional tiller making use of plural juxtaposed cutters, extremely large vibrations are transmitted to the operator's hands through the main body of the device, such as handles, while extremely large noises or creaky sounds are produced.

SUMMARY OF THE INVENTION

It is an object of the present invention to provide a green refresher that makes less noise and transmits fever vibrations to the operators.

In accordance with the present invention, there is provided a green refresher including a plurality of cutters driven into reciprocating oscillations in the fore and aft direction by drive means, said cutters cutting the roots of the lawn and crushing the water-impermeable layer of the tramped soil to permit the moisture to be penetrated deeply below the ground surface, wherein means are provided for transmitting the motive power of the drive means to said cutters in the form of at least two oscillations having discrete phases of oscillation from one another.

According to a preferred embodiment of the present invention, the transmitting means is constituted by a crank unit including a crankshaft and offset shafts carried at predetermined offset positions of said crankshaft. More concretely, the crankshaft is provided with two of the cutters at offset positions dephased 180° relative to each other.

According to the present invention, the motive power of the drive means is provided with means for transmitting the drive power of the drive means in the form of at least two oscillations or vibrations to the respective cutters, so that the cutters are oscillated with a time shift corresponding to the phase shift oF difference. In this manner, the vibrations imparted to the cutters and the force of resistance or reaction developed by the friction of the cutters in the soil cancel each other, so that they are reduced in comparison with the conventional device in which the cutters are oscillated unanimously and synchronously.

Hence the combined oscillations and reactions acting on the main body of the device, such as the handles, may be reduced significantly.

The above and other features of the present invention will become apparent from the following description of the preferred embodiment of the invention, especially when read in conjunction with the accompanying drawings.

DESCRIPTION OF THE PREFERRED EMBODIMENTS

Figure 3:
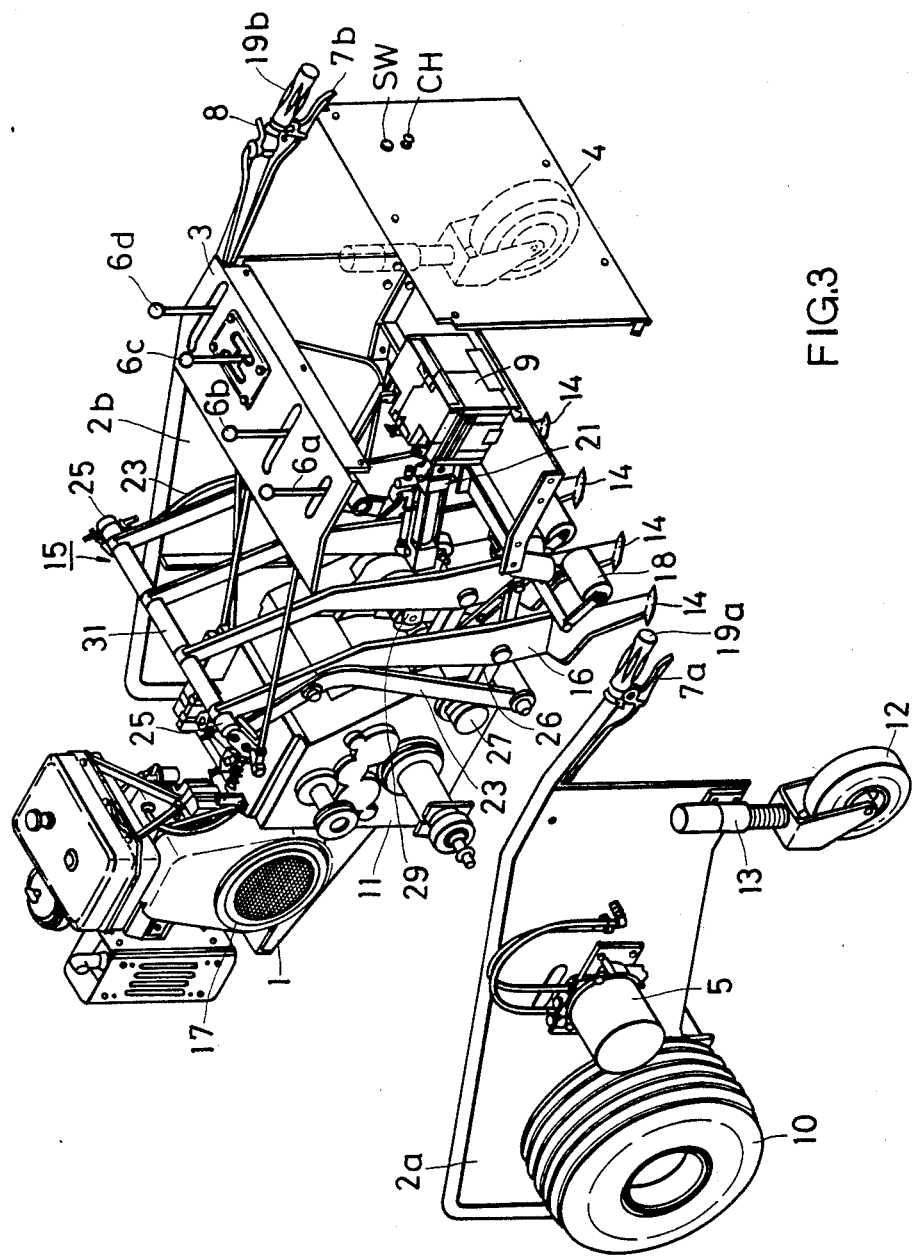
FIG. 3 is a perspective view showing the construction of a green refresher according to a preferred embodiment of the present invention.

Referring to FIG. 3, there is shown a chassis 1 as a main supporting structure for the overall device. To the foremost part of the chassis 1, there is mounted a small-sized internal combustion engine 17 as a drive power source. Towards the rear of the engine 17, there are provided a transmission gearing 11 and a cutter drive unit 15 as will be later described, in this order, to the rear end of the engine 17, there is mounted an operating box 3 on the upper surface of which a variety of operating levers are mounted projectingly, as will be described later. Body side plates 2a, 2b, each fitted with a frame, are mounted to cover both lateral sides of the aforementioned components provided on the chassis, with the upper edge frame bars of the side plates extending towards the rear to form both handles 19a, 19b. Left and right brake levers 7a, 7b are fitted to the grips of the handles 19a, 19b and a throttle lever 8 is provided to the grip of the handle 19b. The rear surface of the operating box 3 ahead of the handles is covered by a cover panel 4. Towards the upper right corner of the cover panel 4, there are provided a starter switch SW for the engine 17 and a choke knob CH.

The numeral 10 designates a driving wheel adapted for driving the device in the fore and aft direction and driven into rotation by the engine 17 by way of the transmission gearing 11. The numeral 12 designates auxiliary idle wheels following behind the drive wheel 10 and each mounted to the side plates 2a, 2b by a castor supporting unit 13 that may be turned freely about its axis to permit the steering of the device.

As shown in FIG. 3, a cutter lift lever 6a, a cutter clutch lever 6b, a transmission change lever 6c and a main clutch lever 6d are provided in the operating box, looking from the left side, while battery 9 and a fluid cylinder piston assembly 21 are provided in the interior of the box 3. The fluid cylinder piston assembly 21 is actuated by means of the cutter lift lever 6a for lifting or lowering the cutter 14.

The motive power of the engine 17 is transmitted to the transmission gearing 11, upon actuating the main clutch lever 6d, and thence to the drive wheel 10, upon actuating the transmission change lever 6c, with the desired torque and direction, and to the cutter drive unit 15, upon actuating the cutter clutch lever 6b.

In the present embodiment, two pairs of cutters 14 are provided in the cutter drive unit 15. Each cutter 14 is secured to the lower end of a cutter arm 16 which is pivotally mounted at its upper end to a shaft 31. Each cutter arm 16 is pivotally connected to a crank arm 26 at a location slightly below a mid point along its length. The cutter arms 16 are also operatively connected to the upper ends of left and right lift frames 23, 23 by means of the shaft 31 and tilling depth adjust link members 25, 25.

Each crank arm 26 is connected to an eccentric or offset crank shaft unit 27 within the transmission gearing 11, in such a manner that the rotational movement transmitted from the engine 17 is converted into a reciprocating movement of the crank arm 26 so that the cutter arms 16 will perform a repeated swinging movement in the fore and aft direction about the shaft 31 as center to cause the oscillations of the cutters 14. With these oscillations of the cutter 14, it is possible to cut old roots in the soil and to till the tramped soil. The cutters 14 are removably mounted to the arms 16 so as to be exchanged depending on the kind of the soil being tilled, and are provided with sharp edges along the oscillating direction.

For avoiding possible conflict of the cutters with the ground surface when the device is simply transported, that is, without tilling, the cutter arms 16 is adapted to be lifted and lowered by the lift arms 23. The lift arms 23 are provided on each on the left and right sides, and are connected at the upper and lower ends by shafts to form a frame. This frame is connected at its upper end to the shaft 31 by the adjustment link members 25, while it is connected at its lower end to a piston rod 29 of the fluid cylinder piston assembly 21. When the piston rod 29 is extended to lower the frame of the lift arms 23, the cutter arms 16 are turned so that the upper ends of the cutter arms 16 are leveled towards the forward side, about the connecting points of the arms 16 with the crank arms 26 as center, so that the cutters 14 at the lower ends of the arms 16 are receded towards above. This operation is performed upon actuation of the cutter lift lever 6a.

The numeral 18 denotes spring-loaded rollers adapted to press and stop up narrow grooves or slits left on the soil surface by the cutters 14, at positions directly at the back of the cutters 14, so as to restore the lawn to the condition preceding the tilling. These rollers 18 are always urged downwardly by springs, not shown, while they may be raised to the upper position along with the arms 16 during transport of the device.

The green refresher according to the present invention is provided with a transmission system for transmitting the motive power of the drive means to the cutters in the form of at least two oscillations having discrete phases. The cutter drive unit 15 adapted to realize this operation, which is an essential portion of the present invention, will be explained hereinbelow, by referring also to FIGS. 1 and 2.

Figure 1:
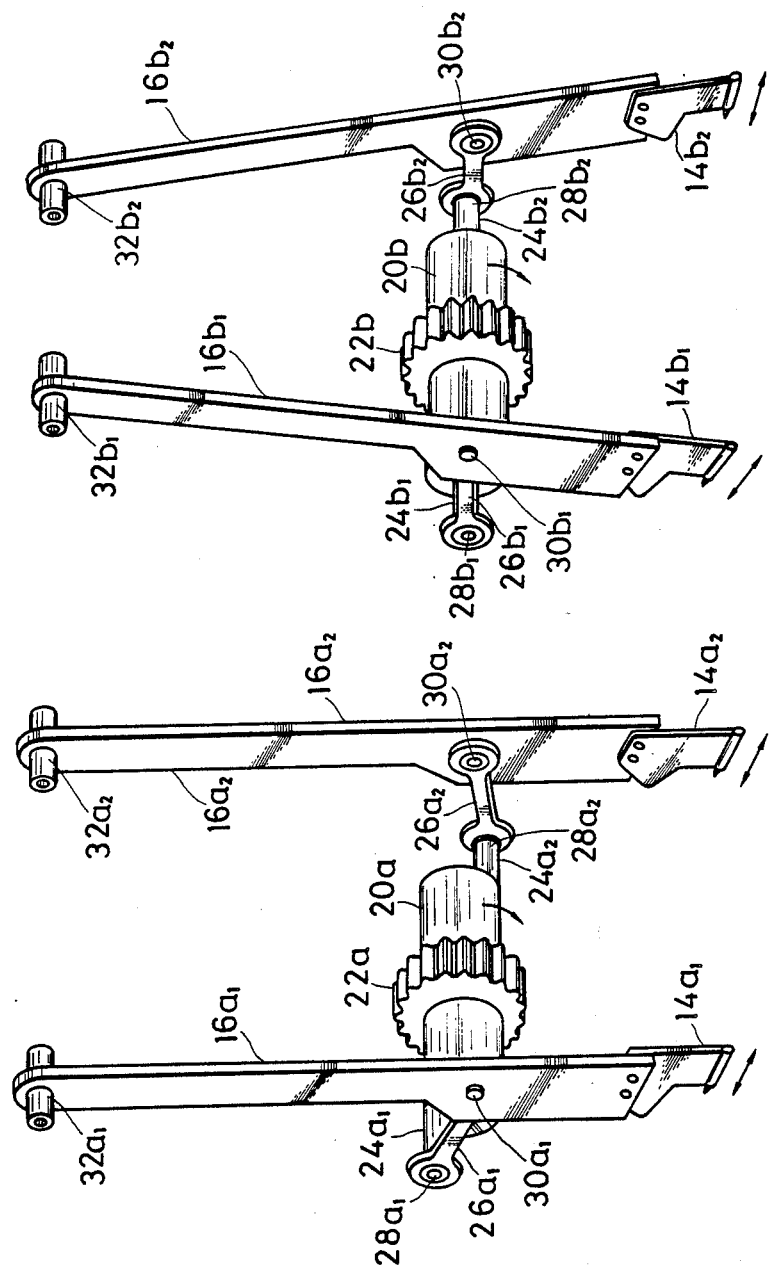
FIG. 1A and 1B are partial perspective views showing the construction of essential parts in a preferred embodiment of the present invention.

In the illustrated embodiment of present invention, two pairs of cutters 14a1, 14a2, 14b1 and 14b2 are used, as shown in FIG. 1., however, this is not limitative of the present invention.

The following description is mainly directed to the crank unit A shown towards the left in FIG. 1.

The numeral 20a in the figure denotes a crankshaft of a crankshaft unit 27 in the transmission gearing 11, the rotational power is transmitted from a main shaft, not shown, of the transmission gearing 11, by means of a gear 22a formed as one with the crankshaft 20a.

The numerals 24a1, 24a2, denote offset shafts projectingly mounted to both end faces of the crankshaft 20a. These shafts are provided at offset positions having a phase difference of 180° to each other with respect to an axis of the crankshaft 20a. Such offset positional relation has been adopted in order to take into account the balance of forces, including the centrifugal force, acting on the crankshaft 20a during rotation.

The numerals 26a1, 26a2, denote crank arms having first ends 28a1, 28a2, connected for rotation to the offset shafts 24a1, 24a2, respectively and the other ends connected for rotation to the aforementioned cutter arms 16a1, 16a2 at pivot portions 30a1, 30a2.

The upper ends 32a1, 32a2 of the cutter arms 16a1, 16a2 are pivotally connected to the shaft 31, as shown in FIG. 3, as mentioned hereinabove.

A crank unit B, shown towards the right in FIG. 1, has the same construction as that of the crank unit A, except for the following point.

That is, the offset shafts 24a1 and 24a2 of the crankshaft 20a of the crank unit A on one hand and offset shafts 24b1, 24b2 of a crankshaft 20b of the crank unit B on the other, are provided at positions dephased 90° with respect to one another.

Hence, referring to FIG. 1, when the offset shafts 24a1 and 24a2 of the crankshaft 20a are at the twelve o'clock position and at the six o'clock position, respectively, the offset shafts 24b1 and 24b2 of the crankshaft 20b are at the nine o'clock position and at the three o'clock position, respectively.

These crankshafts 20a and 20b are rotated synchronously by the main shaft in the transmission gearing 11.

Figure 2:
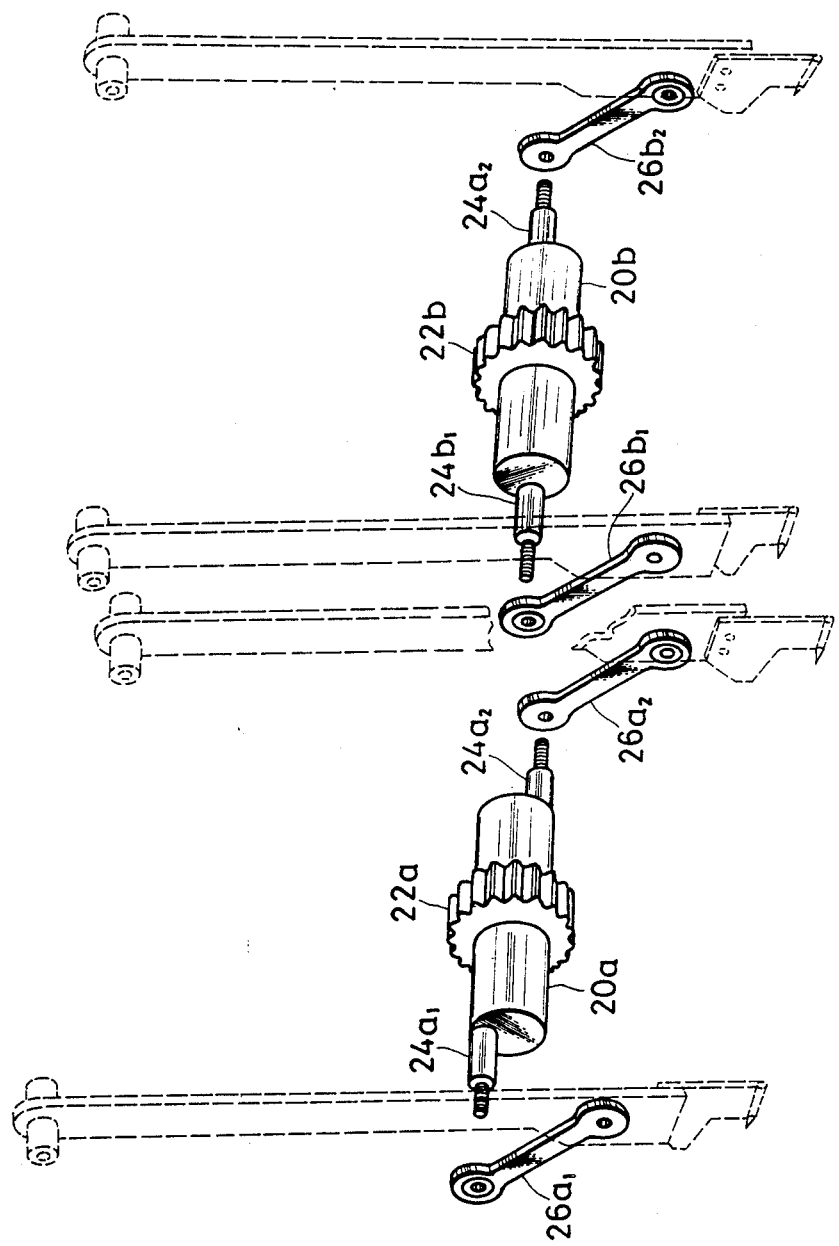
FIGS. 2A and 2B are exploded views showing the construction of a portion of the embodiment of FIGS. 1A and 1B.

Although the mounting position of the crankshafts 20a and 20b and the cutters 14a1, 14a2, 14b1 and 14b2 in the device is not shown in FIGS. 1 and 2, it is preferred that, for reducing the vibrations of the device, in accordance with the object of the present invention, the crankshafts 20a and 20b be provided at a level below the wheel axle and the cutters be provided in close proximity to the driving wheel 10.

The cutters 14a1, 14a2, 14b1 and 14b2 in the above embodiments, operate as follows:

The cutter arms 16 are uplifted by the operation of the cutter lift lever 6a to cause the four cutters 14a1, 14a2, 14b1 and 14b2 to be intruded into the soil. In this state, the rotational force of the engine 17 is transmitted to the crankshafts 20a and 20b by way of the gears 22a and 22b in the transmission gearing 11.

The cutter arms 16a1, 16a2, 16b1 and 16b2 perform reciprocating oscillations in such a manner as to delineate small arcs, about the upper ends 32a1 to 32b2 as center, in the fore and aft direction, as indicated by the double-headed arrow marks in FIG. 1.

The paired offset shafts 24a1 and 24a2 of the crank unit A and the paired offset shafts 24b1 and 24b2 of the crank unit B are each mounted on the crankshafts 20a and 20b, respectively, with a phase difference of 90° with respect to each other, so that a corresponding phase difference is imparted to the oscillations of the cutters of the crank units A and B.

The result is that the four cutter arms 16a1, 16a2, 16b1 and 16b2 are oscillated with the same period and with the phase difference of 90° in the sequence of 16a1, 16b2, 16a2 and 16b1, so that the oscillation synthesized from the oscillations of the cutters does not exhibit any excessive amplitudes. In addition, the external forces applied to the crankshafts 20a and 20b, such as the centrifugal forces, are balanced satisfactorily, while the unnecessary and wasteful vibrations produced in the crankshafts 20a and 20b are cancelled and decreased advantageously.

The offset shafts of the crank units A and B are afforded with the phase difference of 90° with respect to each other, so that the cutters undergo sequential oscillations with a phase lag which is equal to one-fourth of one period of rotation of the crankshafts 20a and 20b. In this manner, the oscillations applied to the cutters and the force of resistance or reaction produced by the friction of the cutters in the soil cancel one another so that the oscillations and the noises transmitted to the main body of the device, such as the handle, may be minimized.

It is to be noted that the above embodiments have been given only by way of illustration and are not to be construed in the sense of limiting the present invention. For example, the drive unit for the cutters may be implemented with the use of offset cams. Although the number of the cutters may be other than four, it is preferred that an even number of the cutters be used in order to cancel the force of reaction produced by the cutter operation.

It is also preferred that, for reducing the oscillations of the device, the cutter arms be provided at the positions as close to the driving wheel as possible, as mentioned hereinabove.

The green refresher of the present invention is provided with means for transmitting the motive power of the drive means to the cutter arms in the form of at least two oscillations having discrete phases of oscillation from one another, as described hereinabove, so that the oscillations and noises transmitted to the main body of the device may be reduced significantly.

What is claimed is:

1. A green refresher including chassis supporting a plurality of cutters which are driven into reciprocating oscillations in the fore and aft directions by drive means, said cutters being adapted for cutting the roots of a lawn and crushing the water-impermeable layer of a tramped soil to permit moisture to be penetrated deeply below the ground surface, wherein the improvement includes transmission means for transmitting the motive power of the drive means to said cutters in the form of at least two oscillations having discrete phases of oscillating from one another, said motive power being transmitted to said cutters by an assembly including a crankshaft unit coupled to said drive means, a crankshaft rotatively coupled to said crankshaft unit, each of said cutters being mounted on one end of a respective cutter arm, the other ends of said cutter arms being pivotally mounted on a common shaft, each of said cutter arms also being pivotally mounted on said crankshaft by means of a crank arm connected to each cutter arm at a point below the midpoint of said arm; a lift frame for lifting said cutter arms and therewith said cutters out of contact with the soil, said cutter arms being operatively associated with said lift frame by means of said common shaft; and a fluid cylinder piston assembly means for moving said lift frame with respect to said chassis towards and away from the soil.

2. The green refresher according to claim 1 wherein said cutter arms are operatively connected to said lift frame by means of tilling depth adjust link members.

3. The green refresher according to claim 1 wherein crank arms connected to adjacent cutter arms are disposed 180 degrees out of phase from each other.

4. The green refresher according to claim 3 wherein said crank arms are each respectively connected to offset shafts mounted at predetermined positions of said crankshaft.

* * * * *